United States Patent [19]

Sawyer

[11] 3,948,489
[45] Apr. 6, 1976

[54] IN-LINE MIXER FOR FLUIDS
[76] Inventor: Harold T. Sawyer, 845 Via de la Paz, Pacific Palisades, Calif. 90272
[22] Filed: Aug. 12, 1974
[21] Appl. No.: 496,396

Related U.S. Application Data
[63] Continuation of Ser. No. 302,003, Oct. 30, 1972, abandoned.

[52] U.S. Cl. ............................. 259/2; 259/DIG. 42
[51] Int. Cl.² ..................... B01F 5/00; B01F 11/00
[58] Field of Search ...... 259/1 R, 2, 4, 72, DIG. 41, 259/DIG. 42, DIG. 44; 198/220 BA, 220 DB

[56] References Cited
UNITED STATES PATENTS

| | | | |
|---|---|---|---|
| 2,143,610 | 1/1939 | Muller | 259/2 |
| 2,661,194 | 12/1953 | Katovsich | 259/4 X |
| 2,772,862 | 12/1956 | Van Süchtelen | 259/DIG. 44 |
| 3,687,420 | 8/1972 | Schweinfurth | 259/2 |

FOREIGN PATENTS OR APPLICATIONS

| 528,992 | 6/1954 | Belgium | 259/DIG. 42 |
|---|---|---|---|

Primary Examiner—Stanley N. Gilreath
Assistant Examiner—Alan Cantor

[57] ABSTRACT

For the continuous mixing of fluid process materials or gases as they flow uninterrupted from a point of initial mixing to a discharge end and processed by means of intense vaporous cavitation, use is made of a resonant tube section having an entrance end and an exit end. The tube section is isolated from the rest of the supporting structure by means of resilient isolation mounts. A source of sinusoidal energy is connected to and excites the resonant tube section into one of its modes of natural frequency causing intense resonant sinusoidal acoustic energy to be developed and transmitted in spherical fashion from the inner resonant tube wall and throughout the flowing fluids. The energy thus released generates intense acoustical vaporous cavitation energy which breaks the surface tension and mixes the materials.

9 Claims, 15 Drawing Figures

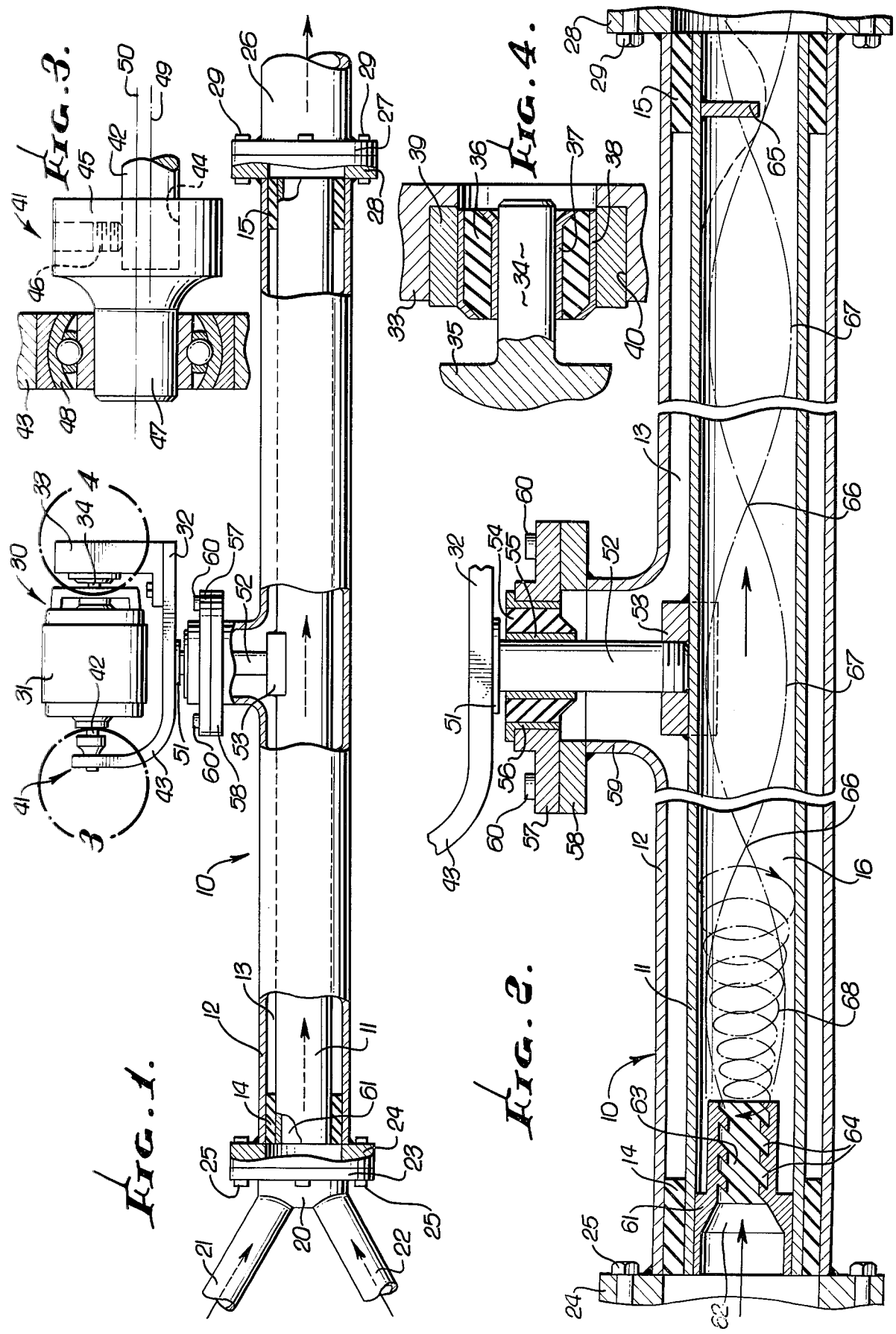

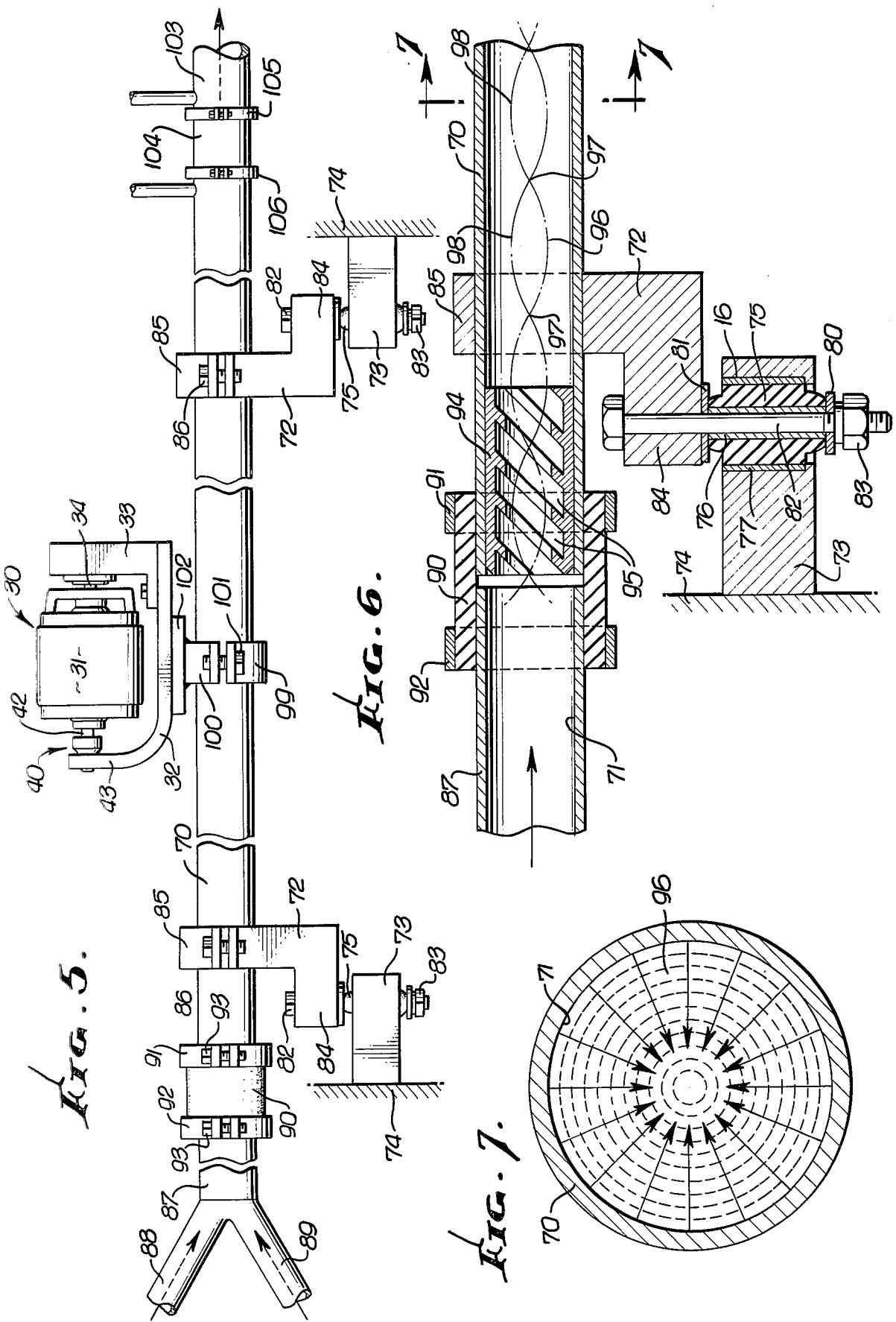

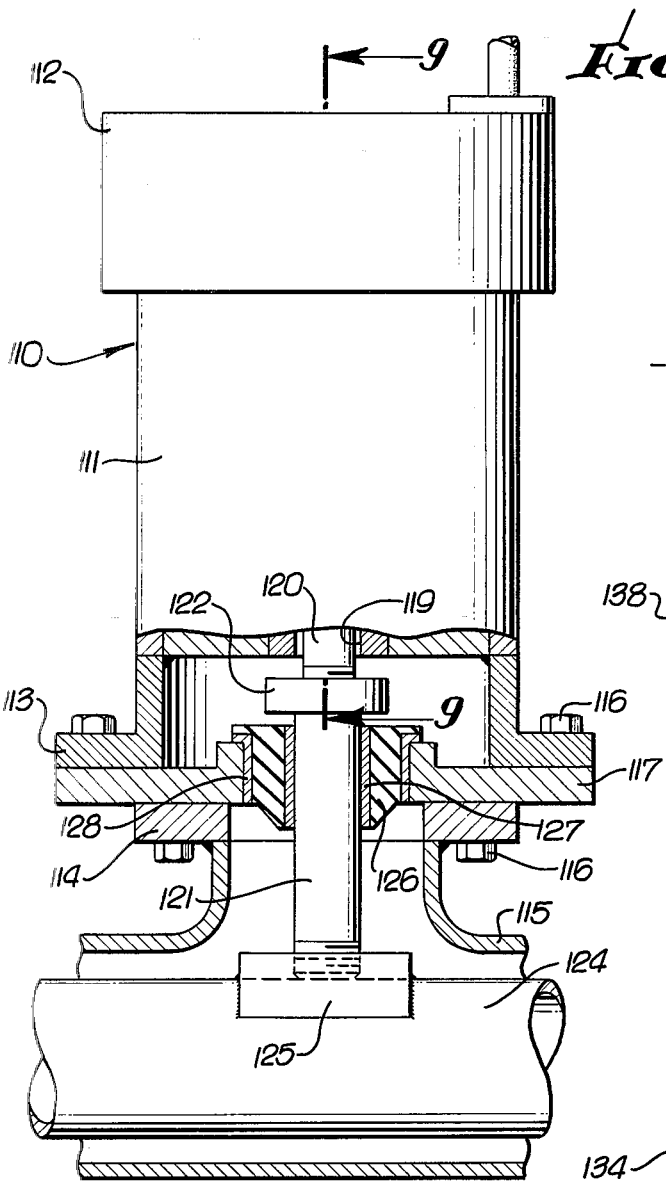
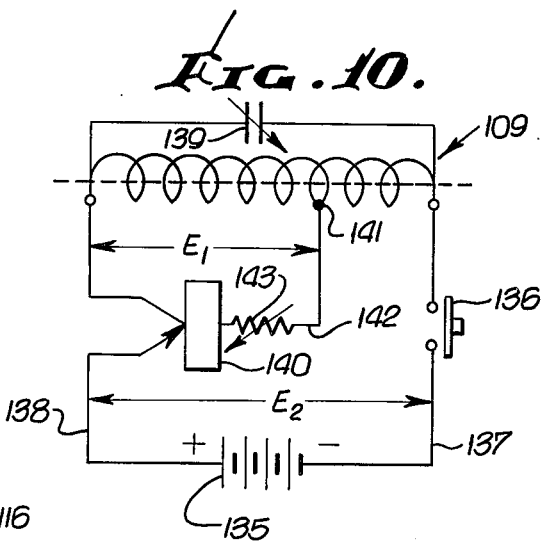
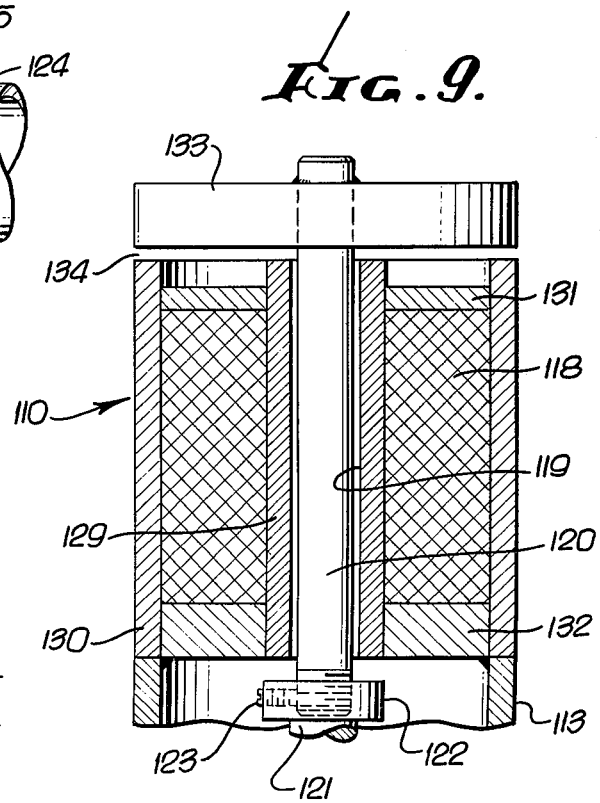
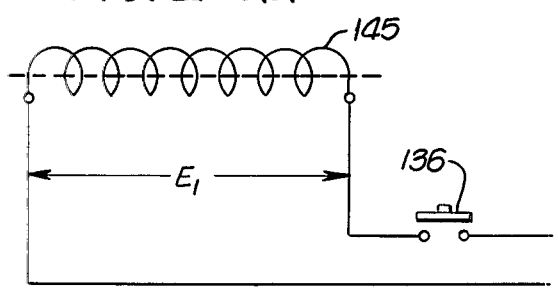

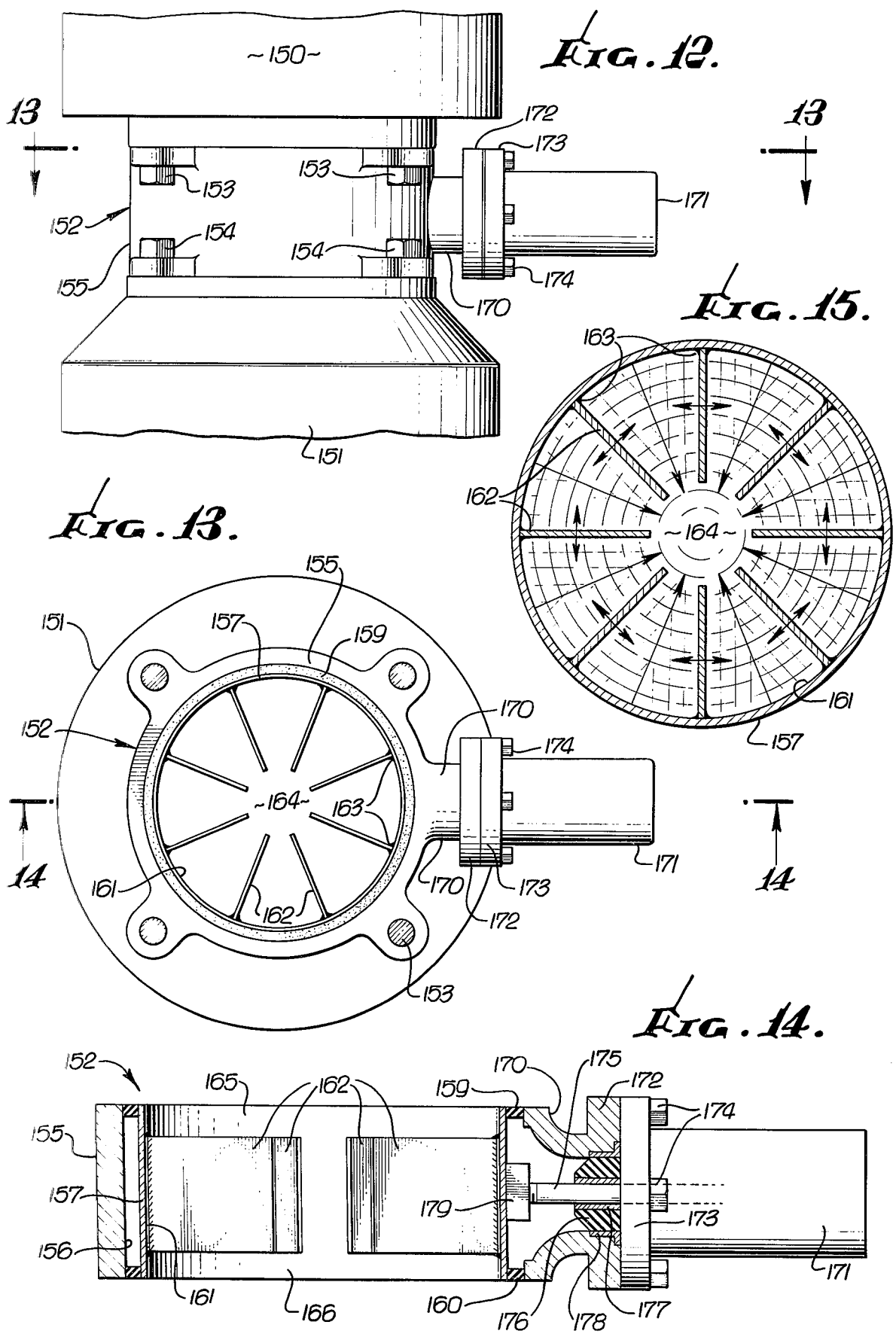

IN-LINE MIXER FOR FLUIDS

This is a continuation of application Ser. No. 302,003, filed Oct. 30, 1972, now abandoned.

Conventional mixers for fluids during passage through a pipe line commonly utilize the principles of paddle wheel mixing, exponential progression of layer generation, orifice chambers and flow directional devices, using the principles of compression and extraction within a pipeline chamber.

Such devices inherently generate a severe pressure drop within the pipeline sections which is costly in terms of power consumption.

In addition, such devices tend to cause a buildup of scale, wall smearing and plugging which in turn causes high maintenance costs. The buildup is also a function of velocity and generally these devices by necessity are limited to the lower velocity flow lines.

The problem to a large extent relates to the quality of mixing. Frequently the quality of mixing is disturbed in conventional devices by the layering effect that occurs between two or more different chemical fluids that are being mixed. This effect occurs in all of the known conventional mixing devices in varying degrees and a certain amount of layering exists after mixing which is generally not tolerable or desired in modern high production processes. The problem occurs largely because the surface tension between the fluids to be mixed is not completely broken. The chemical process industry requires and desires thorough and complete mixing of liquids and gases, without layering, for quality production. An example of layering after mixing may clearly present itself in bottled fluids where separation often can be observed to take place.

Mixing by use of the invention is based on certain principles of physics and fluid mechanics and provides a means of generating a field of acoustical vaporous cavitation within a flowing fluid or gaseous solution of one or more flowing materials that are confined within and pass through a resonant tube section.

The energy thus released within the vaporous cavitation field in turn breaks the surface tensions of the two or more fluid materials, thus freeing them to be dispersed and mixed in "in situ" fashion within the very intense elipsoid energy force patterns thus generated within and throughout the resonant tube section.

Apparatus providing the means for vaporous cavitation is based on the technology of resonant structures and is dynamic in character. The apparatus consists essentially of a sinusoidal frequency generator and a free-free resonant spring mass structure to generate an acoustical vaporous cavitation field within the flowing fluid medium which is within the resonant tube section.

An effective way of generating acoustical vaporous cavitation and one which is used in the invention is to excite the flowing fluid within the resonant tube with intense sinusoidal acoustic energy at one of the known resonant frequencies of the tubular section and in the lower frequency range. The intense cavitation thus developed can be generated at relatively low power.

The longitudinal elastic wave energy at resonance thus released within the tube section causes very intense compressional sinusoidal acoustic wave energy to be produced and transmitted in perpendicular fashion from the inner surface of the resonant tube and spherically through the liquid medium and to the center of the tube section. The speed of the subject compressional acoustic energy, in this case, is estimated to be 5500 feet per second. The energy thus released in the liquid slurry medium transforms the fluid medium into a state of vaporous cavitation.

The phenomenon of acoustical vaporous cavitation and its physical characteristics represents the energy source that breaks the surface tension of the liquids thus making it possible for them to be dispersed at supersonic speeds by means of the intense elipsoid force motions that have been generated within the field of cavitation. The theory of cavitation is based on accepted principles of physics and fluid mechanics.

The sinusoidal resonant acoustic energy traveling in spherical fashion through the liquid medium causes intense energy shearing stresses within the liquid medium at velocities approaching 5500 feet per second for nonpure liquids. The released energy induces an acoustical field of vapor cavities sometimes referred to as NUCLEI. The minute vapor cavities are continuously produced and collapsed and have life cycles which have been observed by camera techniques to be formed at transition speeds of $10^{-9}$ of a second.

The life cycles consist of the formation and collapse of minute elipsoid energy patterns alternately in three planes. The vaporous cavities in turn produce elipsoid bubbles which in turn are also in a state of formation and collapse. During their state of collapse, voids are left and the energy is released to the vaporous cavity. The bubbles, some microscopic and some visible in microns, have been observed to move toward pressure maxima and toward each other. Streamers, sometimes called jets, are caused to form vertically as mutually attracted bubbles travel along their paths. The principles of cavitation-bubble contraction and jet impact have been described and experimentally are presented from which definite analogy between the two effects can be demonstrated. The energy released in the vapor cavity medium forms spherical elipsoid patterns with energy formation in three force planes within the transition medium. The continuous formation and collapse of bubbles and force plane motions thus induced in the vaporous field causes cavitational energy to be released within the liquid. The non-symetrical or bubble collapses when studied and observed by high-speed cameras show that when collapses occur, liquid jets are produced. The liquid jets produced within the liquid are similar to shaped charges used in explosives. This phenomenon has been revealed by means of a high-speed prism camera at shutter speeds exceeding 6,000 frames per second. The elipsoid energy force motion effects caused by the heretofore described energy transitions are known to be extremely violent and intense.

It has been observed experimentally that vapor cavities are better formed and with higher energy transition speeds in fluids that have impurities as compared to distilled water, for instance, and a higher release of energy is observed at higher velocities. It also is known that the surface tension of materials within a cavitational field of energy are broken and, in this case, the liquids or gases to be mixed, thus leaving them free to move in in situ fashion within the energy elipsoid force motion patterns.

Conventional vibration produces only random frequencies and amplitudes which are generally out of phase and, as a result, cavitation would not result since the energy field would not be at resonance. The invention here disclosed is designed to produce and transmit a fundamental sinusoidal excitation frequency and at an amplitude which is sufficient to produce a resonant sinusoidal source of acoustic energy to generate the intense vaporous cavitation within the resonant tube section for mixing the flowing materials.

Advantages of the subject mixer include:
1. Continuous in-line and on-stream operation, either within a process or to a mixing vat.
2. Low maintenance, since the resonant tube section by nature is self-cleaning, thus preventing wall smearing and plugging.
3. Low cost and low power consumption.
4. Very low pressure drop by reason of the device being essentially an open tube.
5. Elimination of layering of the fluids.
6. Not limited by fluid velocity.
7. A higher degree of dynamic mixing is achieved by means of an external power source and resultant cavitation.
8. The surface tension of the fluids is broken within the vaporous field of cavitation thus permitting the turbulent fluid stream to mix freely at very intense energy velocities.
9. Elimination of the need for mixing tanks or vats.

It is therefore among the objects of the invention to provide a new and improved in-line mixer for fluids which is simple in its construction and operation and which by virtue of technique involved assures a complete and total mixture of all particles of the sundry fluids while they are in transit.

Another object of the invention is to provide a new and improved in-line continuous mixer wherein there are virtually no impairments or obstructions to the flow of the fluid while it is being mixed but wherein the particles of the fluids for the entire period of the mixing operation, however long it may be, are continuously and individually agitated whereby to effect a complete and thorough mixing.

Still another object of the invention is to provide a new and improved in-line continuous mixing device for fluids wherein the form of energy made use of to assist in the mixing consists of vibrations in the low sonic range and wherein the design and construction of the mixing equipment is such that virtually a minimum amount of power need be used while at the same time creating substantially the greatest assurance that thorough mixing will be complete.

Further included among the objects of the invention is to provide a new and improved continuous mixing technique making use of sound wave energy to thoroughly mix individual fluids while they are passing through a mixing stage and where the mixing is accomplished without the aid of auxiliary mechanical agitators.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

FIG. 1 is a side elevational view partially broken away showing one form of the mixing equipment.

FIG. 2 is a longitudinal sectional view showing further details of construction capable of employment with the device of FIG. 1.

FIG. 3 is a fragmentary sectional view taken on the circular line 3 of FIG. 1.

FIG. 4 is a fragmentary sectional view taken on the circular line 4 of FIG. 1.

FIG. 5 is a side elevational view of a second form of the invention.

FIG. 6 is a fragmentary longitudinal sectional view at the inflow end of FIG. 5.

FIG. 7 is a cross sectional view on the line 7—7 of FIG. 6.

FIG. 8 is a longitudinal sectional view partially broken away showing an electrically actuated source of sonic energy.

FIG. 9 is a fragmentary longitudinal sectional view on the line 9—9 of FIG. 8.

FIG. 10 is a schematic diagram of a DC circuit used with the source of energy of FIGS. 8 and 9.

FIG. 11 is a schematic diagram of an AC circuit usable in place of the DC circuit of FIG. 10.

FIG. 12 is a side elevational view of a mixer applied to the fuel supply of a combustion engine.

FIG. 13 is a cross sectional view on the line 13—13 of FIG. 12.

FIG. 14 is a longitudinal sectional view on the line 14—14 of FIG. 13.

FIG. 15 is a cross-sectional view showing the pattern of wave motion.

In an embodiment of the invention chosen for the purpose of illustration there is shown a hollow conduit indicated generally by the reference character 10 consisting of an inner tube or pipe 11 and an outer tube or pipe 12. The tubes are spaced from each other forming a cylindrical space 13 between them. Spacing is accomplished by the provision of an annular resilient isolation mount 14 at the inflow end and a similar annular resilient isolation mount 15 at the outflow end. It is important that the mounts be constructed of elastomeric material which is predominately soft in the vertical plane and with a natural frequency sufficiently low to isolate the energy from being imparted to the outer supporting pipe 12. The mounts are preferably secured by bonding them in place with an appropriate adhesive. A passage 16 within the inner resonant tube provides a path of travel of the fluids while they are being mixed.

At the inflow end is a fitting 20 into which projects supply conduits 21 and 22. Although two only are shown by way of example, as many supply conduits may be provided as there are separate fluids, whether liquid or gaseous, which are to be mixed together. A flange 23 on the fitting is connected to a flange 24 on the outer pipe 12 by means of bolts 25. At the opposite end a fitting 26 accepts the mixture of fluids from the passage 16 for passing it to its destination. A flange 27 on the fitting 26 is connected to a flange 28 at the adjacent end of the outer pipe 12 by means of bolts 29.

To generate acoustical vaporous cavitation within the inner tube 11 there is provided a sinusoidal source of acoustic energy 30 which, in the chosen embodiment, is in the form of an electric motor 31 mounted upon an appropriate bracket 32. A source of energy of comparable description has been disclosed in U.S. Pat. Nos. 3,310,129, 3,357,033, 3,497,898 and 3,613,141.

For the source of sinusoidal energy 30 herein made reference to, a rear support bracket is provided with one leg 33 for supporting a stub shaft 34 extending outwardly from a motor casing flange 35. A resilient isolation annular mount 36 is confined between an inner sleeve 37 and an outer sleeve 38. The stub shaft 36 is secured in the inner sleeve and the outer sleeve has a press fit in an annular bushing 39 mounted in a recess 40 of the leg 33.

On the opposite side of the source of sinusoidal energy there is an eccentric mounting indicated generally by the reference character 41 for supporting a motor shaft 42 of the motor 31 on the leg 43 of the bracket 32. As shown in FIG. 3 the motor shaft 42 is anchored in an eccentrically located recess 44 of a stub fitting 45 by means of a set screw 46. A stub shaft 47 is rotatably contained in a bearing ring assembly 48 which is secured in the upper end of the leg 43. In the eccentric mounting 41 thus described, there is a degree of eccentricity between an axis 49 of the motor shaft 42 and an axis 50 of the stub shaft 57 as indicated by the distance between the two axes shown in FIG. 3. This means that the left-hand end of the motor shaft 42 as viewed in FIG. 1 will rotate to the extent permitted by the eccentricity of the axes when the motor is operating, while the stub shaft 34 on the opposite side of the motor remains essentially in a fixed position. Operation will cause the motor mass to oscillate about its shaft creating a sinusoidal force in the leg 43 and the energy thus generated will be passed to a single base support 51 and pass from there through a shaft 52 to a mounting block 53 on the outer wall of the inner tube 11.

In order to physically support the sinusoidal energy source 30 and also to isolate its transmitted energy from being imparted to the outer tube 12 through the shaft 52, a tubular resilient isolation mount 54 is securely mounted to both the shaft 52 and a supporting outer flange 57 respectively. The outer flange 57 is in turn supported by a pipe flange 58 on an extension 59 of the outer pipe 12 by means of bolts 60.

The center portion of the resilient isolation mount is composed of elastomeric material which is predominately softer in the vertical plane than in the lateral plane which permits a freedom of motion and support. The natural frequency of the material is sufficiently low by design to isolate the passage of energy to the flange 52.

To produce a turbulent flow mixture of fluids passing through the passage 16 in the inner tube 11 there may be provided a nozzle 61 having a funnel-shaped entrance port 62 and an exit port 63 provided with spiral rifling grooves 64.

At the opposite end of the inner tube 11 is an eccentric orifice baffle 65 extending part way across the passage 16 for the purpose of providing a final compression of the fluids after mixing.

In the operation of this form of the device the fluids which are to be mixed are supplied under appropriate pressure through the supply conduits 21 and 22 and enter the passage 16 at the inflow end which is to the left in FIGS. 1 and 2. In the simple form of the device of FIG. 1, the two fluids flow together through the internal passage 16 of the resonant tube 11 wherein the fluids are transformed into a state of vaporous cavitation in the manner described.

The fundamental frequency of the sinusoidal energy source 30 may be chosen in the low sonic range such as, for example, at a value from 60 to 250 cycles per second. The sinusoidal energy thus transmitted by the energy source 30 at a chosen fundamental frequency is transferred to the inner resonant tube 11 through an exterior support flange 53. The resonant tube is in turn supported at both ends by annular resilient isolation mounts 14 which are constructed of elastomeric material and bonded to the outer walls of tube 11 and the inner walls of pipe section 12. The isolation mounts are predominately soft in the vertical plane as compared to the lateral plane and have a natural frequency sufficiently low to prevent energy from being imparted to the outer pipe 12. The inner tube 11 is therefore essentially what may be described as free-free in terms of freedom of motion since the tube is only slightly damped at its extremities.

The sinusoidal energy at a desired amplitude is thus transferred to the resonant tube 11 and in turn excites intense elastic wave motion within the metal of the tube wall which is longitudinal in nature and at resonant frequency which represents the true natural frequency of the tube 11. The desired natural frequency mode relative to fundamental excitation frequency may be selected by design for best results and usually a mode number of 3 to 8 is selected. The design for a desired natural frequency mode is based in part on the mass of the tube, its physical dimensions and its modulus of elasticity.

The intense compressional acoustic sinusoidal energy which is produced at the inner wall of resonant tube 11 is directed spherically to the center of the tube section at a velocity approaching 5500 feet per second as shown in FIG. 7. The very intense shearing stresses thus produced within the flowing fluids causes the material to be transformed into a state of intense vaporous acoustical cavitation. The exposure to the field of cavitation causes a breakdown of the surface tension that exists between the liquids or gases and a thorough mixing of the materials takes place within the very intense elipsoid energy patterns that occur within the vaporous cavitation fields as they pass in continuous flow from the inflow end to the outflow end of the resonant tube.

To further assist in the thoroughness and speed of mixing an initial spiral path 68 given to the fluids which are to be mixed as they pass through the rifling grooves 64 physically mixes the fluids in part by turbulence early in their passage through the inner tube 11 so that mixing as the result of application of vaporous cavitation energy can be accomplished more quickly or at greater speeds of fluid flow. The diversion and compression accomplished by baffle 65 at the outflow end is a further aid to the mixing effect accomplished by the device.

Occasions may arise when it is necessary to mix liquids, for example, under especially high pressures, as high for example as 2,000 lbs. per sq. in. or higher. Since the wall of the inner tube 11 is relatively thin in order to have it resonate properly the wall could be too thin to carry the high pressure without likelihood of rupture. For such use perforations (not shown) are provided through the wall of the inner tube 11 so that the pressure is carried into the cylindrical space 13 making substantially a zero pressure differential on opposite sides of the wall of the inner tube 11. The hollow conduit 10, not subject to application of the sinusoidal, can be made as heavy as need be for the pressure encountered.

In the form of device of FIGS. 5, 6, and 7 a single resonant tube 70 is made use of serving as a conduit, the tube providing a passageway 71. For mounting the tube, use is made of brackets 72 at respective opposite ends of the tube 70 whereby to secure the tube on bases 73 of a supporting structure 74. To isolate the brackets and accordingly the tube 70 from the supporting structure, a gland 75 for each bracket 72 is made use of, the gland being of resilient elastomeric isolation material. As shown in FIG. 6, the gland is confined between an inner sleeve 76 and an outer sleeve 77, the assembly thus formed being confined between washers 80 and 81 on a bolt 82 by means of a nut 83, the bolt extending through a leg 84 of the bracket 72 as shown in FIG. 6. A clamp 85 secured by bolts 86 serves to anchor the tube 70 to the brackets 72.

A fitting 87 has connected to it supply conduits 88 and 89 for liquids or gases of one kind or another which are to be mixed. To keep the tube 70 properly isolated, a sleeve 90 of elastomeric absorbing material is attached by means of clamps 91 and 92 respectively to the tube 70 and fitting 87, clamping being accomplished by the bolts 93. Here also a nozzle 94 may be employed at the inflow end of the tube 70, the nozzle being provided with rifling grooves 95 to impart to both fluids which are to be mixed a swirling effect as they enter the inflow end of the tube 70 wherein surface tension of the fluids is broken and processed by the application of acoustical vaporous cavitation within the resonant tube 70 wherein nodes 97 and antinodes 98 are produced as shown in FIG. 6.

In this form of the device the source of sinusoidal energy source 30 heretofore described is made use of except that in this instance clamp elements 99 and 100 are secured together by bolts 101 and in that way secure the source of sinusoidal energy on the exterior of the tube 70. In this instance a base support 102 on the clamp element 100 serves as the single connection between the source of sonic energy 30 and the tube 70.

At the outflow end of the tube 70 is a fitting 103 for conducting the mixed fluid mass to its destination. A sleeve 104 of elastomeric damping material is secured by means of clamps 105 and 106 respectively to the fitting 103 and tube 70 to prevent energy being set up in the tube 70 from leaking to the fitting 103.

The schematic cross-sectional view of FIG. 7 illustrates the formation and transmission of intense compressional and spherical sound wave energy at resonance from the inner surface of resonant tube 70 to the center of the tube section. The compressional sound wave energy at resonance produces an intense field of sinusoidal acoustic energy and a resultant field of intense acoustic vaporous cavitation within the liquids or gases to be mixed.

In another embodiment of the invention illustrated generally in FIGS. 8, 9, 10 and 11, the source of sinusoidal energy is electrical and derived from a coil assembly indicated generally by the reference character 110. The coil assembly is a barrel 111 and a cap 112 seals the top of the barrel. A stainless steel flange 113 at the lower end of the barrel is secured to a flange 114 on an outer pipe 115 by means of bolts 116 acting through a plate 117.

In the coil assembly 110 is a coil 118 through which is a central bore 119 which contains a stainless steel rod 120. A rod extension 121 attached to the rod by means of a threaded collar 122 with a locking set screw 123 is attached to an inner resonant tube 124 by means of a mounting block 125.

Mounted centrally with the plate 117 is a resilient isolation mount gland 126 constructed of elastomeric material and confined between inner and outer sleeves 127 and 128 respectively whereby to provide a seal, provide freedom of motion vertically and to isolate energy from being imparted to flange 117.

As shown in FIG. 9, the coil 118 is provided with respective inner and outer magnetic pole pieces 129 and 130. Annular confining washer 131 is of stainless steel and serves to contain the coil. A spacer 132 is constructed of iron and serves to complete the flux path for pole pieces 129 and 130.

At the upper end of the rod 120 is pole flange 133 spaced from the upper ends of the inner and outer pole pieces 129 and 130 by a distance determined by an air gap 134.

In FIG. 10 a simple oscillator circuit 109 is illustrated which provides for periodically energizing the coil 118 at a frequency which is adjusted to match one of the natural frequency modes of the resonant tube 124.

The oscillator circuit 109 includes a capacitor 139 connected across the coil 118 to form a tank circuit. A transistor 140 has its base connected by line 142 including a resistor 143 to a coil tap 141 positioned at a selected point along the coil 118. A six or twelve volt battery 135 has its negative line 137 connected through a switch 136 to one end of the coil 118 and has its positive line 138 connected through the emitter-collector path of the transistor 140 to the other end of coil 118.

The operation sequence applicable to FIGS. 8, 9 and 10 is one such that when the switch 135 is closed a voltage is placed across the transistor 140 causing current to start flowing through the coil 118 which builds up the magnetic field around the coil 118. This magnetic field follows the flux path through the pole pieces 129 and 130, the pole flange 133 and the spacer 132. At the instant the magnetic field builds up, the pole pieces 130 attract the magnetic pole flange 133 thus substantially closing the air gap 134 and causing a vertical force motion downwardly on the rod 120 and rod extension 121. The oscillator circuit provides for periodically building up the magnetic field around the coil 118, thereby to deflect and excite the resonant tube 124 at one of its natural frequency modes.

The operation of the oscillator circuit is such that the increasing current flowing through coil 118 adjusts the voltage on the coil tap 141 causing the transistor 140 to be driven to saturation. Meanwhile the voltage across the coil 118 has been accumulating a charge on capacitor 139. At saturation there is no longer a change of current and the voltage across coil 118 begins to drop causing the charge on the capacitor 139 to flow through the coil 118 in the opposite direction. The reversed magnetic field no longer attracts the magnetic pole flange 133 and adjusts the voltage on the coil tap 141 to cause the transistor 140 to be quickly driven to cutoff. After the capacitor 139 is discharged, the voltage on the coil tap 141 again returns to a condition which causes the transistor to conduct current from the battery 135 through the coil 118, and the action just described is continuously repeated.

The frequency of the oscillation of the current in the tank circuit, i.e., the frequency of the building up of the magnetic field about the coil 118 for attracting the magnetic pole flange 133 depends on the value of the coil 118 and the capacitor 139. By making capacitor 139 variable, a wide range of frequencies can be secured so as to match one of the natural frequency modes of the resonant tube 124.

More particularly, the oscillating circuit can be adjusted by adjusting capacitor 139 to oscillate at a frequency so as to enable the tube 124 to resonate at or near its natural frequency in order to produce acoustical cavitation within fluids which may be liquids or gases flowing through it.

The six or twelve volt DC circuitry shown in FIG. 10 is especially adaptable to small low-powered units for gaseous or fluid fuel mixing, for example. Such a device lends itself particulary well to the mixing of air with a gaseous fuel or fuel vapors passing to the intake manifold of an internal combustion engine, thereby to increase burning efficiency and reduce the exhaust pollutants.

Although the device of FIGS. 8, 9 and 10 has been described as one operating by virtue of a DC circuit, it will be understood that an alternating current circuit can be utilized as suggested in FIG. 11. In this Figure is shown an AC 115 volt solenoid 145 across which there is a voltage $E_1$. The solenoid 145 is one capable of taking the place, physically, of the coil 118 thereby to exercise its action upon the rod 120 and rod extension 121 through connection to the inner tube 124 as already described.

The AC alternating sinusoidal force applied to the rod 120 and its extension 121 provide excitation for the resonant tube, namely, the inner tube 124 at 60 cycles per second due to the electrical characteristics of the AC 115 volt circuit. In this case the resonant tube is also designed for one of the desired modes of natural frequency that can be excited by the fundamental sinusoidal frequency of the 60 cycle AC current. Accordingly, the resonant tube 124 generates a field of sinusoidal acoustic vaporous cavitation within the flowing fluids which processes and mixes the flowing materials.

In the form of invention of FIGS. 13 through 15 inclusive the invention is shown set up in connection with the fuel supply of a combustion engine, namely, for the purpose of effectively and thoroughly mixing air and fuel which already has been proportioned for being passed to the engine or turbine intake manifold. As shown by way of example, there is provided a fuel air blending device 150 which may be a device such for example as the carburetor of a combustion engine and an intake manifold 151. An in-line mixer indicated generally by reference character 152 is shown located between the blending device 150 and the manifold 151 bolted permanently to each by means of bolts 153 and 154.

The mixer 152 consists of a cylindrical housing 155 providing a cylindrical chamber 156. Within the chamber is a relatively thin-walled resonant cylindrical shell 157 which is mounted concentrically within the chamber 156 by employment of resilient tubular elastomeric isolation mounts 159 and 160. The isolation mounts, annular in form, provide a press or sliding fit for the shell in the housing. Mounted as described the shell 157 forms a cylindrical passage 161 between the blending device 150 and the manifold 151 which serves as a mixing passage.

Located in the cylindrical passage 161 is a series of radially disposed substantially rectangular vanes 162 which are secured by weldments 163 at their outside ends to the shell 157. The inside ends are spaced from each other forming a clear passage 164 at a central location.

In the chosen embodiment there are eight vanes disposed at a 22.5° angle with respect to each other and forming a corresponding number of separate passages through the center of the cylindrical passage 161. Inasmuch as the vanes have a longitudinal dimension less than the full length of the cylindrical passage 161, they, in effect, allow for respective upper and lower cavities 165 and 166 which are clear of the vanes.

On a projection 170 at the side of the housing 155 is mounted a solenoid 171 by means of a flange 172 on the projection and a matching flange 173 on the solenoid, the flanges being attached to each other by means of bolts 174. The solenoid is similar to the solenoid described in FIGS. 8 through 11 inclusive and may be operated by a circuit such as that diagrammed in FIG. 10.

A rod 175 from the solenoid passes through an annular sliding gland 176 retained between respective inner and outer sleeves 177 and 178. The rod attaches to a mounting block 179 on the wall of the resonant cylindrical shell 157.

In this form of the device the solenoid portion of the solid state oscillator circuit is used to excite the thin-walled resonant cylindrical shell 157 into one of its natural frequency modes by means of its sinusoidal force motion. The mode natural frequency of the cylindrical shell is selected by design and the frequency of the oscillating circuit is adjusted to be in phase with the resonant frequency of the shell, considering as part of the mass, the vanes 162.

The elastic wave motion of the cylindrical shell at resonance causes sinusoidal acoustical compression wave energy to be launched in perpendicular and spherical fashion from the inner shell surface and to be transmitted in a direction toward the center line of the shell passage 161. The acoustic wave energy is spherical in character and travels at a velocity of approximately 5500 feet per second.

The sinusoidal elastic wave motion of the shell in turn excites the vanes 162 into one of their resonant frequency modes which, in turn, cause a sinusoidal acoustic wave energy to be launched in perpendicular fashion from both sides of the vane surfaces and in a direction through the cavity, as suggested in FIG. 15.

The resonant sinusoidal acoustic energy velocity causes intense shearing stresses within the fuel and air mixture and produces vaporous cavitation within the mixture, thus causing the constituents of the mix to be dispersed, mixed and driven together in the manner described previously. The acoustic wave energy travelling in spherical fashion from the inner wall of the resonant shell intersects the acoustic wave energy transmitted laterally from the surfaces of the vanes and the shearing stresses thus released within the mixture are very intense. The vaporous cavitation energy field and associated energy velocity direction patterns as noted are shown in FIG. 15. The mixture of fuel and air constituents are transformed into a field of vaporous cavitation whereby their surface tensions are broken, and they are driven further together and mixed by the intense force motion elipsoid energy patterns in the three planes at life-cycle velocities of $10^{-9}$ seconds.

As a result, the mixer just described offers a means of thoroughly mixing fuel and air before it undergoes combustion. The device is self-contained, small and compact, enabling it to be fitted between the blending device and manifold of substantially all makes of currently available combustion engines. Thus by thoroughly mixing fuel and air constituents before combustion, problems of mixture imbalance and variations in mixture ratio are greatly improved. The mixer, accordingly, provides a means of producing more complete combustion with better control and stability thereby dictating a higher fuel economy and a reduction of pollutant emissions.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A mixer for the continuous mixing of fluids comprising a hollow main conduit for the continuous passage of fluids having an inflow port and an outflow port and being resilient throughout the length thereof between said ports, resilient supporting means having a supporting engagement with said conduit throughout at least a portion of its length, a plurality of supply conduits for respective fluids to be mixed, said supply conduits having discharge ends directed into said inflow port, a single source of sinusoidal energy having a predetermined mass and including a mounting member, said mounting member being subject to said sinusoidal energy, and being in direct communication with said hollow main conduit at a single location intermediate opposite longitudinal extremities of said resilient supporting means, said single source of sinusoidal energy having a line of action in perpendicular alignment with the longitudinal centerline of said main conduit, said source of sinusoidal energy having an attachment to the main conduit at an antinode and extending longitudinally for a distance less than the distance between adjacent nodes.

2. A mixer for the continuous mixing of fluids as in claim 1 wherein said main conduit is a resonant tube with a separate element of said resilient supporting means being located at each end of said tube, wherein resilient isolation means is located between said tube and said supply conduits whereby to isolate said tube from said supply conduits and wherein said main conduit comprises a portion of a closed system.

3. A mixer for the continuous mixing of fluids as in claim 1 wherein said mounting member for the source of sinusoidal energy is a bracket located intermediate opposite ends of the main conduit and in a radially outward direction from the center mass of said source of sinusoidal energy along a line perpendicular to the longitudinal centerline of said main conduit.

4. A mixer for the continuous mixing of fluids as in claim 1 wherein there is a spirally rifled sleeve at said inflow port through which fluid enters the conduit whereby to impart a spiraling motion to the fluid as it moves through the conduit.

5. A mixer for the continuous mixing of fluids as in claim 1 wherein the mass of said source and the mass of said conduit have a relationship productive of vibration of the conduit in a condition at or near resonance.

6. A mixer for the continuous mixing of fluids as in claim 1 wherein said conduit is an elongated resonant tube and said resilient supporting means comprises a stationary member adjacent each end of the tube and an isolation pad between the ends of the tube and the respective stationary member.

7. A mixer for the continuous mixing of fluids comprising a hollow conduit for the continuous passage of fluids having an inflow port and an outflow port, resilient supporting means having a supporting engagement with said conduit throughout at least a portion of its length, a plurality of supply conduits for respective fluids to be mixed, said conduits having discharge ends directed into said inflow port, a source of sinusoidal energy including a mounting member, said mounting member being subject to said sinusoidal energy, and being in direct communication with said hollow conduit at a location intermediate opposite longitudinal extremities of said resilient supporting means, said conduit comprising an elongated resonant tube and wherein there is a second tube of larger diameter than said first identified tube and coextensive and concentric therewith, said resilient supporting means comprising elastomeric pads respectively at opposite ends of the conduit isolating said tubes from each other.

8. A mixer for the continuous mixing of fluids as in claim 7 wherein a portion of the mounting member extends through the second tube and into engagement with the first tube, there being a resilient isolation pad between said second tube and said mounting member and wherein there is a deflecting baffle extending part way across the interior of said first tube adjacent the outflow port.

9. A mixer for the continuous mixing of fluids as in claim 7 wherein a portion of the mounting member extends through the second tube and into engagement with the first tube, there being a resilient isolation pad between said second tube and said mounting member.

* * * * *